United States Patent [19]

Shiratori et al.

[11] 4,424,984

[45] Jan. 10, 1984

[54] ALIGNMENT ADJUSTING DEVICE FOR VEHICLE

[75] Inventors: Harunori Shiratori; Kenichi Kikuchi; Yoshikazu Moriya, all of Toyota, Japan

[73] Assignee: Toyota Jidosha Kogyo Kabushiki Kaisha, Aichi, Japan

[21] Appl. No.: 358,209

[22] Filed: Mar. 15, 1982

[30] Foreign Application Priority Data

Apr. 7, 1981 [JP] Japan ................................. 56-52287

[51] Int. Cl.³ ............................................. B62D 17/00
[52] U.S. Cl. ..................................... 280/661; 280/701
[58] Field of Search ................... 280/95 R, 661, 673, 280/674, 675, 691, 701

[56] References Cited

U.S. PATENT DOCUMENTS

| 2,859,058 | 11/1958 | Traugott | 280/661 |
| 2,890,893 | 6/1959 | Laukhuff | 280/661 |
| 3,526,413 | 9/1970 | Muller | 280/661 |
| 3,880,444 | 4/1975 | Bridges | 280/661 |
| 3,917,308 | 11/1975 | Schulz | 280/691 |

Primary Examiner—Joseph F. Peters, Jr.
Assistant Examiner—Ross Weaver
Attorney, Agent, or Firm—Oblon, Fisher, Spivak, McClelland & Maier

[57] ABSTRACT

A shaft member oscillatably supporting a suspension arm and inserted into slots provided respectively in a pair of spaced arm supporting members secured fixedly to a chassis comprises a bolt and a hollow shaft for receiving the bolt. A disk-shaped cam is disposed on one end of the hollow shaft. The hollow shaft is provided on the other end with a non-round fit portion. An engaging member having a non-round hole into which the fit portion is inserted is provided with a cam surface having the same profile as that of the disk, a tool engaging portion outside this cam face and a threaded portion into which is screwed the bolt. The bolt is screwed into the threaded hole of the engaging member from the outside of the cam and fastened temporarily. When the engaging member is turned with a tool, the cam faces of the cam and engaging member engage respective guide walls provided on the arm supporting members and rotate to move the shaft member along the slots.

6 Claims, 9 Drawing Figures

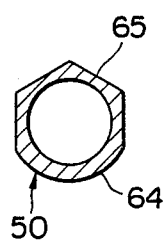
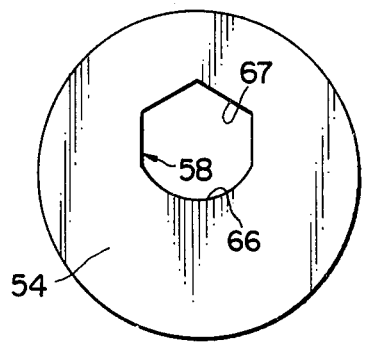
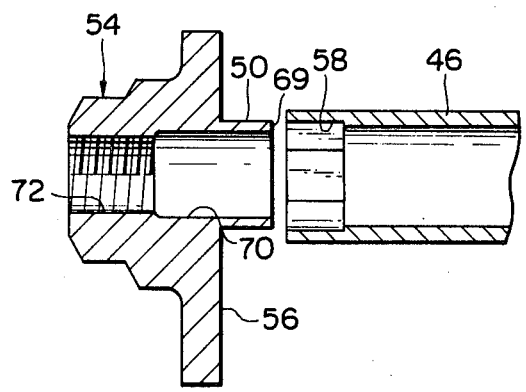

ALIGNMENT ADJUSTING DEVICE FOR VEHICLE

BACKGROUND OF THE INVENTION

The present invention relates to an alignment adjusting device and more particularly to an alignment adjusting device for a vehicle adapted to adjust the toe of a wheel in a suspension of an automobile.

Conventional alignment adjusting devices used for adjusting the toe of a wheel mounted on a suspension arm in a suspension of an automobile are substantially similar to the one disclosed in U.S. Pat. No. 3,917,308 as follows.

Guide plates respectively having guide walls are fixed to a pair of brackets spaced from each other and projecting from a chassis so that said guide walls are outside the brackets, and a pair of cams engage respectively said guide walls of each guide plate. An eye of the suspension arm is located between said two brackets, and a bolt extended through a through hole of one cam, respective slots of one guide plate and bracket passes through said eye and further respective slots of the other bracket and guide plate and the through hole of the other cam. In this case the through holes provided in said two cams are not completely circular, but formed to include a partially linear portion so that the relative positions of the linear portion and the profile of the cam are determined to align the phases of both cams when the linear portions of both holes coincide with each other. On the other hand, said bolt is provided on the outer periphery with a chord-shaped cut-out portion throughout the whole length of the bolt. This cut-out portion conforms to said linear portions of said both cams, so that both cams are rotated synchronously by rotating the bolt with their phases coinciding with each other. Accordingly, the adjustment of alignment is carried out by rotating the bolt to change the degree of engagement of the respective cams with the guide walls of the respective guide plates for moving the eye relatively to said pair of brackets.

After said adjustment a nut temporarily screwed to an end portion of the bolt is permanently fastened by an impact wrench. In this case, if the bolt is rotated to carry out the fastening of bolt and nut, both cams are rotated, so that not only specially performed adjustment becomes useless, but also original function of adjusting alignment is not achieved at all. Hence, it is needed to turn the nut with the bolt fixed. Thus, a space for preventing the bolt from abutting against any obstacles when the bolt is put in and out is needed outside one bracket, and outside the other bracket is needed a space to dispose an impact wrench.

As apparent from the aforementioned, the use of said alignment ajusting device needs a space occupied originally by this alignment adjusting device plus the space for putting in and out the bolt and the space for disposing the impact wrench, so that said alignment adjusting device could not be used in a small space.

SUMMARY OF THE INVENTION

Accordingly, an object of the present invention is to provide an alignment adjusting device for a vehicle usable in a smaller space.

Another object of the present invention is to provide an alignment adjusting device used for adjusting the toe of a wheel in a suspension of an automobile.

According to the present invention is provided a device for adjusting the alignment of a suspension arm for a vehicle which comprises a shaft member extending through slots provided respectively in a pair of spaced arm supporting members secured fixedly to the chassis and supporting rotatably a suspension arm; and a pair of cams disposed respectively at both end portions of the shaft member and engaging guide walls provided on said respective arm supporting members.

Said shaft member comprises a bolt and a hollow shaft for receiving the bolt. One of said pair of cams is a disk which is disposed eccentrically and non-rotatably or fixed, to said hollow shaft at one end portion thereof, and the other of said pair of cams is engaging member which engages the other end portion of said hollow shaft and has a cam face with the same profile as that of said disk. Said hollow shaft has a non-round or non-circular fit portion at one end opposite to that at which said disk is disposed. On the other hand, said engaging member has: a non-round or non-circular hole which extends axially outward from the inside surface thereof and conforms to the fit portion of the hollow shaft in shape to receive the fit portion; a threaded hole communicating to the non-round hole, extending outward therefrom and engaging the threads of said bolt inserted into said hollow shaft from the outside of said disk; and a tool engaging portion provided more outward than said cam face.

According to the other features of the present invention, said hollow shaft has a non-round or non-circular hole at the end opposite to that where said disk is disposed, and said engaging member has: a non-round or non-circular fit portion extending axially inward from the inside surface which abuts against said one arm supporting member and having a shape conforming to that of the non-round hole of said hollow shaft to effect a fit with said hole; a hole extending outward from the inner end of the fit portion and having threads at least in one portion to be screwed onto the end portion of said bolt inserted into said hollow shaft from the outside of said disk; and a tool engaging portion provided more outward than said cam face.

According to preferred embodiments of the present invention, said non-round fit portion and non-round hole are respectively provided with means for aligning rotational positions of said disk and engaging member with each other about the axis of said hollow shaft. Thus, only by inserting the non-round fit portion into the non-round hole and screwing the bolt into the threaded portion of said engaging member to temporarily fix the former to the latter, the cam face of said disk and that of said engaging member have the same phase to the guide walls of said respective arm supporting members.

The other objects and features of the present invention will be apparent from the description of embodiments of the present invention with reference to the accompanying drawings.

BRIEF DESCRIPTION OF THE DRAWINGS

FIG. 7 is a sectional view similar to FIG. 5 showing another embodiment of the fit portion;

FIG. 8 is a front view similar to FIG. 6 showing another embodiment of the engaging member; and FIG. 9 is a sectional view showing principal parts of the engaging member and the hollow shaft in another embodiment.

DETAILED DESCRIPTION OF THE INVENTION

Figure 1:
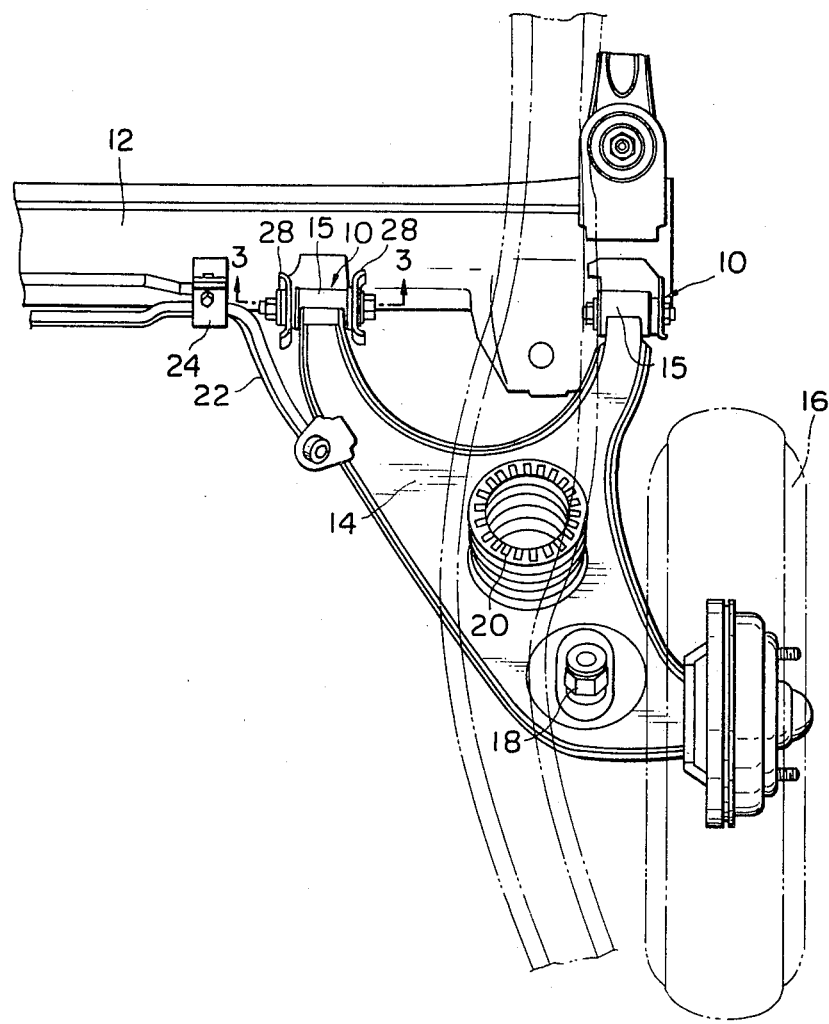
FIG. 1 is a perspective view showing principal parts of a suspension of an automobile incorporating an alignment adjusting device according to the present invention.
Figure 2:
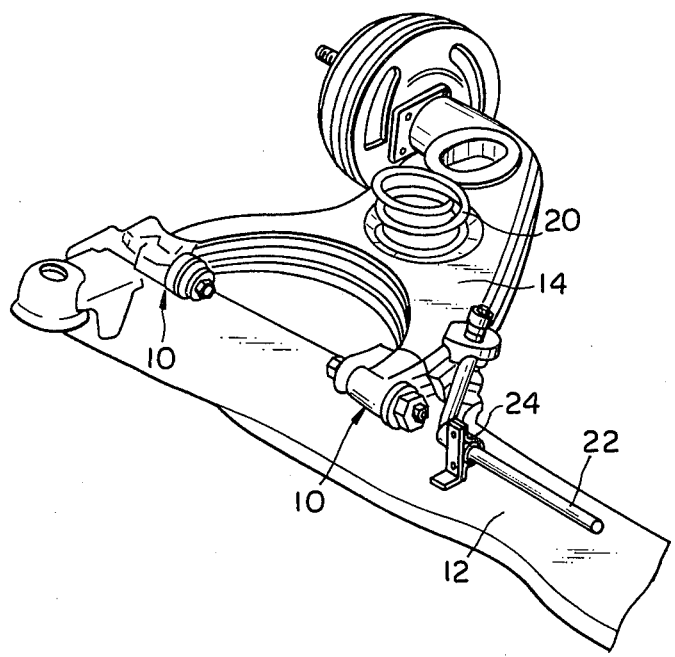
FIG. 2 is a perspective view of said parts as viewed from the back of FIG. 1.

As shown in FIGS. 1 and 2, an alignment adjusting device 10 for a vehicle according to the present invention is installed between a chassis 12 (only a portion of which is illustrated) and a suspension arm 14 to be used for adjusting the toe of a wheel 16.

In this embodiment, the suspension arm 14 is in the type of a trailing arm and supports the wheel 16 at the free end side. A shock absorber (not shown) is connected to a mounting seat 18 on this suspension arm 14 by a well-known method per se and buffs vibration applied to the suspension arm 14 in cooperation with a spring 20.

When obstacles like a stabilizer-bar 22 and a clamp 24 for the stabilizer-bar 22, for example, were in a space where the alignment adjusting device 10 should be installed, the clamp 24 needed to be removed to deviate the stabilizer-bar 22 to other places every time the alignment was adjusted by the use of prior alignment adjusting devices. Also, if the obstacles were such as those secured fixedly on the chassis 12, for example like a reinforcing rib, any alignment adjusting device of quite a different configuration must be employed, or the position where the suspension arm 14 is mounted could not help being restrained. The alignment adjusting device 10 according to the present invention resolves such problems.

Figure 3:
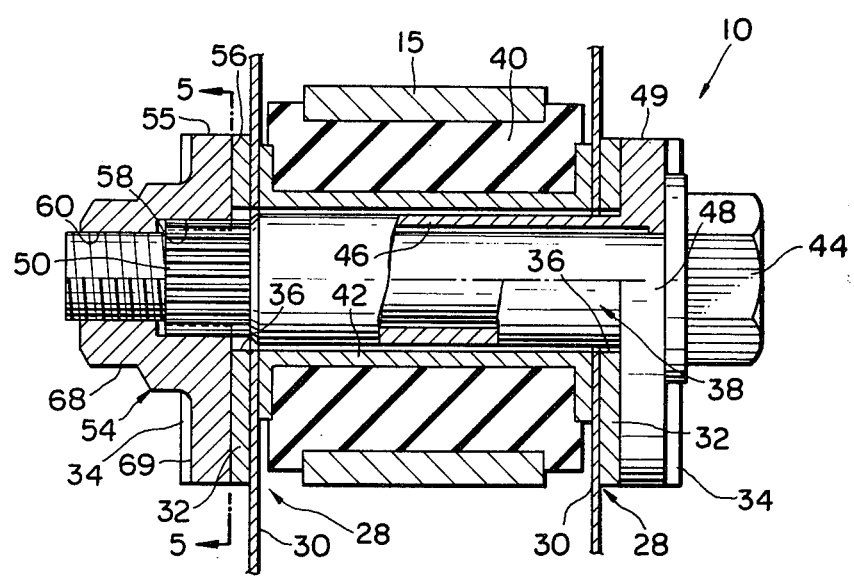
FIG. 3 is an enlarged sectional view taken along line 3—3 of FIG. 1.
Figure 4:
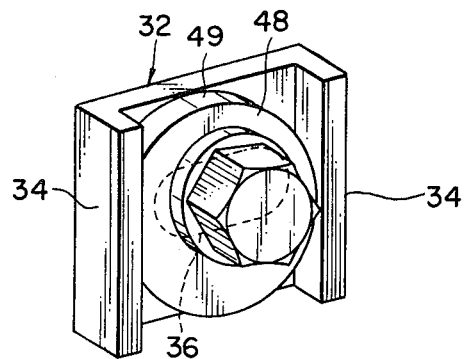
FIG. 4 is a perspective view showing as cam and a guide plate.

A pair of arm supporting members 28 in an embodiment shown in FIG. 3 are consisted of a pair of spaced brackets 30 projecting from the chassis 12 and guide plates 32 fixed to the outside of the respective brackets 30. As shown in FIG. 4, each guide plate 32 is formed in the form of a groove having a pair of guide walls 34 extending vertically at both sides and provided in the approximately central portion with a slot 36 having the longitudinal axis extended horizontally. A shaft member 38 which will be described hereinafter is moved in and along this slot 36.

Said brackets 30 may be provided with the same slots as those in the guide plates 32 or with cutouts longer than that of the slot 36 in the guide plate. Furthermore, the guide plate 32 may be projected from and fixed to the bracket 30 so that a portion of the slot 36 in the guide plate does not contact the bracket. The bracket 30 and the guide plate 32 may be formed of one piece of member to provide an arm supporting member 28.

Said shaft member 38 is inserted into the slots 36 of said pair of arm supporting members 28. On the other hand, the shaft member 38 extends through a cylindrical member 42 fitted in a rubber bushing 40 attached to the eye 15 of said suspension arm 14 and supports the eye 15 oscillatably. Said shaft member 38 comprises a bolt 44 and a hollow shaft 46 receiving the bolt 44.

A disk 48 is disposed eccentrically and non-rotatably to an end of the hollow shaft 46 to constitute a cam. In the embodiment shown, the disk 48 is formed integrally with the hollow shaft 46. Instead, the disk 48 and the hollow shaft 46 may be separately formed. For example, the disk 48 may be provided with a serrated through hole and the hollow shaft 46 may be provided with an end portion serrated on the outer periphery to be fitted in the through hole. In this specification that the disk 48 is disposed non-rotatably to an end of the hollow shaft 46 means to include aforementioned forms. The cam face 49 of this disk 48 engages a pair of guide walls 34 provided on one of said pair of arm supporting member 28.

Figure 5:
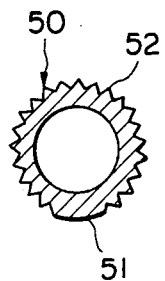
FIG. 5 is a sectional view of a fit portion of a hollow shaft taken along line 5—5 of FIG. 3.

On an end portion of said hollow shaft 46 opposite to that where the disk 48 is located is provided a non-round fit portion 50 which, as shown in FIG. 5, is serrated over the whole outer periphery 52 except for a portion 51 thereof.

The engaging member 54 is a cam having a cam face 55 with the same profile as that of the cam face 49 of said disk 48. This cam face 55 engages a pair of guide walls 34 provided on the other of said pair of arm supporting members 28. This engaging member 54 is provided with a non-round hole 58 extending axially outward from the inside surface 56 which abuts against the arm supporting member 28 and a threaded hole 60 communicating to this hole 58 and extending axially outward. The end portion of said bolt 44 is screwed into this threaded hole 60.

Figure 6:
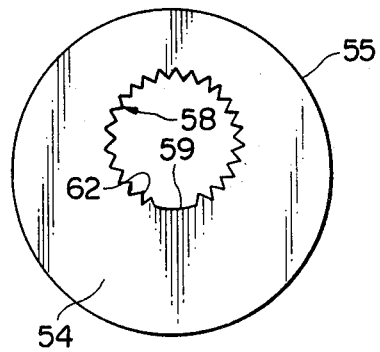
FIG. 6 is a front view of an engaging member as viewed from line 5—5 of FIG. 3.

As shown in FIG. 6, said non-round hole 58 is serrated over the whole inner periphery 62 except for a portion 59 and formed to conform to the non-round fit portion 50 of said hollow shaft 46. And said fit portion 50 fits in this hole 58. As aforementioned, the portions 51,59 of fit portion 50 of said hollow shaft 46 and the hole 58 of said engaging member 54 are not serrated. Thus, the fit portion 50 will fit in the hole 58 only when these portions 51,59 coincide with each other. Since the cam face 49 of the disk 48 is beforehand set to have the same phase as that of the cam face 55 of the engaging member 54 under such fit condition, both cam faces occupy the same rotational position and the same sections of both cam faces 49,55 bear against the same sections of a pair of the guide walls 34 respectively when the disk 48 and engaging member 54 are rotated. Since the cam faces cannot be aligned with each other only by forming and fitting the fit portion 50 and the hole 58 in the non-round form, it is preferable to form them like said embodiment.

FIGS. 7 and 8 show another embodiment of such alignment. Namely, the fit portion 50 is provided with an arcuate portion 64 and a hexagonal portion 65. On the other hand, the hole 58 is provided with an arcuate portion 66 and a hexagonal one 67 respectively conforming to the arcuate portion 64 and the hexagonal one 65 of the fit portion 50.

The alignment can be adjusted by turning the engaging member 54 as will be described hereinafter and thereby by turning synchronously the disk 48 through the hollow shaft 46 so long as the hole 58 of the engaging member 54 and the fit portion 50 of the hollow shaft 46 are formed into a non-round form to fit to each other. However, from a practical point of view, it is preferable that the force applied to the engaging member 54 is dispersed substantially uniformly to the outer periphery of the hollow shaft 46 and transmitted to the hollow shaft 46 so that stress is not concentrated in the connection between the engaging member 54 and the hollow shaft 46. Thus, the embodiments respectively shown in FIGS. 5 and 6, 7 and 8 are preferable.

Said engaging member 54 is provided on the outer periphery with a tool engaging portion 68 projecting outward from said cam face 55. To the tool engaging portion 68 is applied a tool such as a wrench. In the embodiment shown, this tool engaging portion 68 is a facet portion of a hexagonal nut. When the outer peripheral surface corresponding to the threaded hole 60 like the embodiment shown provides substantially the facet portion, for example, a disk having the same size as the disk 48 and a through hole eccentrically may be welded to a nut with the axis of the through hole being aligned with the axis of the nut to provide the engaging member 54. Also, the engaging member may be formed of a block material by machining, cold forging, etc. In such machining or cold forging, the tool engaging portion 68 may be serrated or knurled instead of said facet portion. Otherwise, the outside surface 69 orthogonal to the cam face 55 may be provided with a plurality of small holes which provide the tool engaging portion. In this case, a handle-shaped tool with a plurality of projections conforming to such a plurality of small holes is used. In this specification, a tool engaging portion provided more outward than the cam face means to include aforementioned forms.

FIG. 9 shows an embodiment in which the engaging member 54 is provided with the fit portion 50 having a non-round profile and the hollow shaft 46 is provided with the non-round hole 58 conforming to this fit portion 50. These fit portion 50 and hole 58 are shaped similarly to those of said embodiment. The fit portion 50 projects inward from the inside surface 56 of the engaging member 54 which abuts against the arm supporting member 28 and a hole 70 is provided outward from the inner end 69 of the fit portion 50. At least a portion 72 of this hole 70 is threaded and screwed onto the threads of said bolt 44 inserted into the hollow shaft 46.

The toe of the wheel 16 is adjusted by the alignment adjusting device for a vehicle according to the present invention as follows;

The eye 15 of the suspension arm 14 is located between said pair of arm supporting members 28 and the engaging member 54 is disposed on the outside surface of the arm supporting member 28 located near the clamp 24. The hollow shaft 46 is inserted into the eye 15 from the outside of the other arm supporting member 28 so that the disk 48 abuts against the outside surface thereof. Then the fit portion 50 of the hollow shaft 46 is fitted in the hole 58 of the engaging member 54. Thereafter, the bolt 44 is inserted into the hollow shaft 46 from the ouside of the disk 48 and the bolt 44 is screwed a little into the threaded hole 60 of the engaging member 54 and fastened temporarily. When the engaging member 54 held under such condition is turned by applying a wrench or the like to the tool engaging portion 68, the disk 48 is rotated in synchronization with the engaging member 54, so that the respective cam faces 49,55 bear against the guide walls 34 provided on the respective arm supporting members 28. Then, since the movement of the engaging member 54 and the disk 48 is restricted by the shaft member 38 extending through the slots 36, the shaft member 38 will move consequently along the slots 36. Thus, the eye 15 of the suspension arm 14 moves to adjust the toe of the wheel 16. After adjusting the toe a wrench, for example an impact wrench, is applied to the head of the bolt 44 to turn and fasten the bolt 44 permanently.

Further, while in the embodiment shown in FIG. 1 the alignment adjusting device 10 is installed to the suspension arm 14 on the two portions, it may be installed on only either of the two portions.

Since according to the present invention the alignment adjusting device can be used so long as a required space is provided at the bolt inserting side, a space smaller than prior one will do for the use of such device. Further, since the device is fastened by turning the bolt, an impact wrench can be also used by utilizing the space at the bolt inserting side to improve the rate of operation. Also, since the hollow shaft and the engaging member are interconnected with the fit portion being inserted in the hole, stress concentrated in the connection when force is transmitted to the disk by turning the engaging member can be eliminated and the hollow shaft having thin wall thickness can be used.

What is claimed is:

1. A device for adjusting the alignment of suspension arms for a vehicle comprising a shaft member oscillatably supporting a suspension arm and inserted into respective slots provided in a pair of arm supporting members secured fixedly to a chassis, and a pair of cams disposed respectively at both ends of said shaft member and engaging guide walls provided on said respective arm supporting members, said shaft member comprising a bolt and a hollow shaft for receiving the bolt, one of said pair of cams being a disk disposed eccentrically and non-rotatably fixed to one end portion of said hollow shaft, the other of said pair of cams being an engaging member engaging the other end portion of said hollow shaft and having a cam face with the same profile as that of said disk, said hollow shaft having a non-circular fit portion at the opposite end portion to that where said disk is disposed and said engaging member having a non-circular hole extending axially outward from the inside surface thereof for receiving the fit portion of said hollow shaft with a shape conforming to that of the fit portion, whereby relative rotation between said engaging member and said hollow shaft is prevented, a threaded hole communicating outward to said non-circular hole and receiving an end portion of said bolt inserted into said hollow shaft from the outside of said disk and a tool engaging portion provided more outward than said cam face of the engaging member.

2. A device for adjusting the alignment of suspension arms for a vehicle comprising a shaft member oscillatably supporting a suspension arm and inserted into respective slots provided in a pair of arm supporting members secured fixedly to a chassis, and a pair of cams disposed respectively at both ends of said shaft member and engaging guide walls provided on said respective arm supporting members, said shaft member comprising a bolt and a hollow shaft for receiving the bolt, one of said pair of cams being a disk disposed eccentrically and fixed to one end portion of said hollow shaft, the other of said pair of cams being an engaging member engaging the other end portion of said hollow shaft and having a cam face with the same profile as that of said disk, said hollow shaft having a non-circular hole at the opposite end portion to that where said disk is disposed and said engaging member having non-circular fit portion extending axially inward from the inside surface of the engaging member which abuts against said arm supporting member and having a non-circular shape conforming to that of the non-circular hole of said hollow shaft for fitting in the non-circular hole, whereby relative rotation between said engaging member and said hollow shaft is prevented, a hole extending outward from the inner end of the fit portion and having at least a portion of threads into which the end portion of said bolt inserted into said hollow shaft from the outside of said disk is screwed and a tool engaging portion provided more outward than said cam face of the engaging member.

3. An alignment adjusting device for a vehicle as claimed in claim 1 or 2, wherein said non-circular fit portion and non-round hole are respectively provided with means for aligning the rotational positions of said disk and engaging member about the axis of said hollow shaft.

4. An alignment adjusting device as claimed in claim 1 or 2, wherein the hollow shaft of said shaft member is formed integrally with said disk.

5. An alignment adjusting device as claimed in claim 1 or 2, wherein said engaging member is formed of a block material.

6. An alignment adjusting device as claimed in claim 1 or 2, wherein the device is used for adjusting the toe of a wheel.

* * * * *